United States Patent
Wang et al.

(10) Patent No.: US 10,930,909 B2
(45) Date of Patent: Feb. 23, 2021

(54) PROTECTIVE PRESSURE PLATE AND BATTERY MODULE

(71) Applicant: Contemporary Amperex Technology Co., Limited, Fujian (CN)

(72) Inventors: Qing Wang, Fujian (CN); Linggang Zhou, Fujian (CN); Derong Wang, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 92 days.

(21) Appl. No.: 16/358,864

(22) Filed: Mar. 20, 2019

(65) Prior Publication Data

US 2019/0305277 A1  Oct. 3, 2019

(30) Foreign Application Priority Data

Mar. 30, 2018 (CN) .......................... 201810292528.9

(51) Int. Cl.
*H01M 2/10* (2006.01)
*H01M 2/12* (2006.01)
(Continued)

(52) U.S. Cl.
CPC ......... *H01M 2/1094* (2013.01); *H01M 2/024* (2013.01); *H01M 2/0245* (2013.01);
(Continued)

(58) Field of Classification Search
CPC ........... H01M 2/10; H01M 2/12; H01M 10/42
See application file for complete search history.

(56) References Cited

U.S. PATENT DOCUMENTS

| | | | |
|---|---|---|---|
| 2005/0170240 A1* | 8/2005 | German ............... | H01M 2/1223 429/120 |
| 2009/0239137 A1* | 9/2009 | Kakuchi ............. | H01M 2/1016 429/151 |

(Continued)

FOREIGN PATENT DOCUMENTS

| CN | 101625988 A | 1/2010 |
|---|---|---|
| CN | 105378975 A | 3/2016 |

(Continued)

OTHER PUBLICATIONS

The First Official Action and search report dated Apr. 14, 2020 for Chinese application No. 201810292528.9, 10 pages.

(Continued)

*Primary Examiner* — Kenneth J Douyette
(74) *Attorney, Agent, or Firm* — Law Offices of Liaoteng Wang

(57) ABSTRACT

The present disclosure relates to a protective pressure plate and a battery module. The protective pressure plate comprises a pressure plate body having a strip-like shape. The pressure plate body includes an upper surface and a lower surface that are opposed in a thickness direction of the pressure plate body and two side surfaces that are opposed in a width direction of the pressure plate body. At least one portion of each of the side surfaces is recessed toward a center line of the pressure plate body to form a protective recess. The upper surface of the pressure plate body has a maximum width greater than a maximum width of the lower surface. The protective pressure plate according to the embodiment of the present disclosure can be used to fix the circuit board and protect the bonding wires, thereby improving the use safety and stability of the battery module.

12 Claims, 9 Drawing Sheets

(51) Int. Cl.
*H01M 10/42* (2006.01)
*H01M 2/02* (2006.01)

(52) U.S. Cl.
CPC ....... *H01M 2/1077* (2013.01); *H01M 10/425* (2013.01); *H01M 2010/4271* (2013.01); *H01M 2220/20* (2013.01)

(56) References Cited

U.S. PATENT DOCUMENTS

2012/0247997 A1  10/2012  Thomas
2014/0162090 A1*  6/2014  Whitacre ............ H01M 2/1077
                                                      429/7

FOREIGN PATENT DOCUMENTS

DE    102012205020 A1   10/2013
EP         2765628 A1    8/2014
WO      2017068705 A1    4/2017

OTHER PUBLICATIONS

The extended European search report dated Oct. 8, 2019 for European Application No. 19164763.5, 6 pages.

* cited by examiner

PROTECTIVE PRESSURE PLATE AND BATTERY MODULE

CROSS-REFERENCE TO RELATED APPLICATION

This application is based on and claims priority to Chinese Patent Application No. 201810292528.9 filed on Mar. 30, 2018, which is incorporated herein by reference in its entirety.

TECHNICAL FIELD

The present disclosure relates to the technical field of battery, and in particular, to a protective pressure plate and a battery module.

BACKGROUND

With continuous developments of technologies, power batteries are applied to more and more regions involving production and life. The power battery, also known as secondary battery, is a rechargeable battery. The power batteries are widely used. The power batteries with a low capacity may be applied to small electric vehicles, and the power batteries with a high capacity may be applied to large electric vehicles, such as hybrid electric vehicles or electric cars. When the power batteries were used in groups, a plurality of power batteries are packaged to form a battery module. A busbar is needed to connect two adjacent power batteries with each other in series or in parallel. In addition, in order to keep the battery module lightweight, each power battery is electrically connected to an external component via a flexible circuit board (FPC). The busbar is electrically connected to the flexible circuit board via wires. However, if the wires are directly exposed to the outside and the rigidity of packaging housing of the battery module is insufficient to be deformed, the wires are directly extruded to be broken or unsoldered, thereby affecting use safety and stability of the battery module.

SUMMARY

Embodiments of the present disclosure provide a protective pressure plate and a battery module. The protective pressure plate can be used to fix the circuit board and protect the bonding wires, thereby improving the use safety and stability of the battery module.

According to one aspect, an embodiment of the present disclosure provides a protective pressure plate for a battery module, comprising a pressure plate body having a strip-like shape, the pressure plate body includes an upper surface and a lower surface that are opposed in a thickness direction of the pressure plate body and two side surfaces that are opposed in a width direction of the pressure plate body, at least one portion of each of the side surfaces is recessed toward a center line of the pressure plate body to form a protective recess, the upper surface of the pressure plate body has a maximum width greater than a maximum width of the lower surface.

According to an aspect of the embodiment of the present disclosure, a region where the protective recess is formed on the side surface transitions smoothly from the upper surface to the lower surface.

According to an aspect of the embodiment of the present disclosure, a region where the protective recess is formed on the side surface has a circular or a stepped cross section.

According to an aspect of the embodiment of the present disclosure, the pressure plate body further includes a limiting groove which is recessed from the upper surface toward the lower surface, and the limiting groove extends in a length direction of the pressure plate body.

According to an aspect of the embodiment of the present disclosure, the pressure plate body further includes a flow guiding groove which is recessed from the lower surface toward the upper surface, and the flow guiding groove extends in a length direction of the pressure plate body.

According to an aspect of the embodiment of the present disclosure, the pressure plate body further includes fixing holes and connecting holes extending in the thickness direction, and the fixing holes and the connecting holes are spaced apart in a length direction of the pressure plate body.

According to an aspect of the embodiment of the present disclosure, the protective pressure plate further comprises a flexible buffering member, the flexible buffering member is connected to the pressure plate body and disposed on the lower surface, the flexible buffering member extends in a length direction of the pressure plate body, the flexible buffering member has a yielding space extending in the thickness direction of the pressure plate body and penetrating the flexible buffering member, the region on the pressure plate body corresponding to the yielding space is exposed to external environment.

According to an aspect of the embodiment of the present disclosure, the flexible buffering member includes two buffering strips which are spaced apart in the width direction of the pressure plate body, and the yielding space is a gap formed between the two buffering strips; or the flexible buffering member is a buffering pad, the buffering pad has a through hole extending in the thickness direction of the pressure plate body, and the yielding space is the through hole.

The protective pressure plate according to the embodiment of the present disclosure can be used not only to fix the circuit board, so as to maintain the position of the circuit board, but also to protect the bonding wires connecting the circuit board and the busbar by using its protective recess, so as to prevent the bonding wires from being deformed, broken or electrically disconnected from the circuit board or the busbar due to the external force. Therefore, use safety and stability of the battery module is improved.

According to one aspect, another embodiment of the present disclosure provides a battery module, comprising a plurality of batteries, which are arranged side by side in one direction, wherein two adjacent batteries in the plurality of batteries are electrically connected by a busbar, each battery including a top cover; a circuit board, which is disposed on an outer surface of the top cover of the battery and extends in a direction in which the plurality of batteries are arranged; wires, via which the circuit board is electrically connected to the busbar; and the above-mentioned protective pressure plate, wherein the protective pressure plate is disposed above the circuit board to press the circuit board against the outer surface of the top cover, at least one portion of the wire is received in the protective recess to be protected by the protective recess.

According to an aspect of the embodiment of the present disclosure, the upper surface of the pressure plate body has a width greater than or equal to a width of the circuit board, and the lower surface has a width less than or equal to a width of the circuit board.

According to an aspect of the embodiment of the present disclosure, the battery module further comprises two end plates between which the plurality of batteries are disposed, and the protective pressure plate is connected fixedly to at least one of the end plates by fasteners.

According to an aspect of the embodiment of the present disclosure, the battery module further comprises an insulating shield for covering all the batteries and the protective pressure plate, wherein the insulating shield is disposed above the batteries, and the insulating shield is snap-fitted to the protective pressure plate by a snap-fit member.

BRIEF DESCRIPTION OF THE DRAWINGS

Features, advantages, and technical effects of the exemplary embodiments of the present disclosure will be described below with reference to the drawings.

Figure 1:
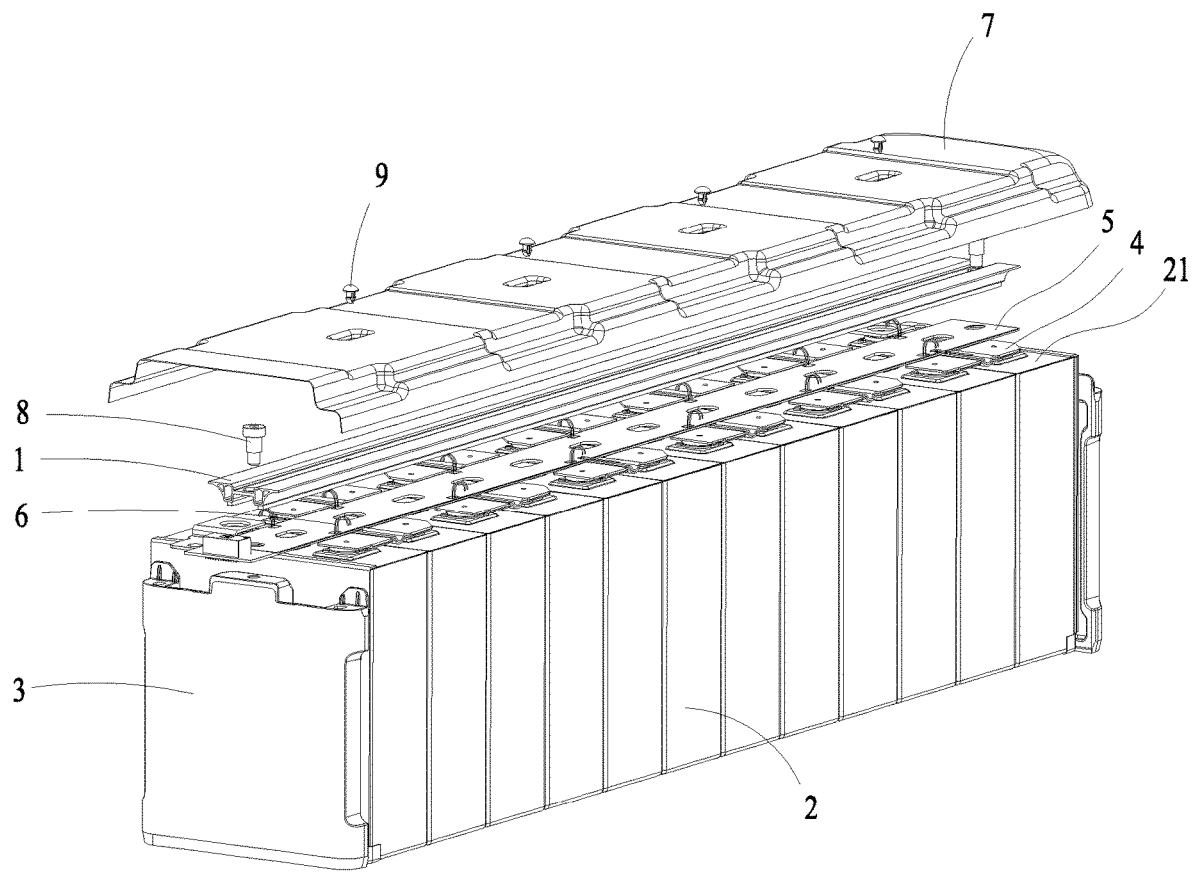
FIG. 1 is a schematic view showing an exploded structure of a battery module according to an embodiment of the present disclosure.

In the drawing, the figures are not drawn to scale.

DETAILED DESCRIPTION

Below, embodiments of the present disclosure will be further described in detail with reference to the drawings and embodiments. The detailed description according to the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inside", "outside", and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installed", "connected to", and "connected with" are to be understood broadly, and may be, for example, a fixed connection, a disassemble connection, or an integral connection; or may be a direct connection or an indirect connection through an intermediate medium. The specific meaning of the above terms in the present disclosure can be understood by the person skilled in the art according to actual circumstance.

For better understanding of the present disclosure, a protective pressure plate according to embodiments of the present disclosure will be described below in detail with reference to FIGS. 1 to 10.

Figure 2:
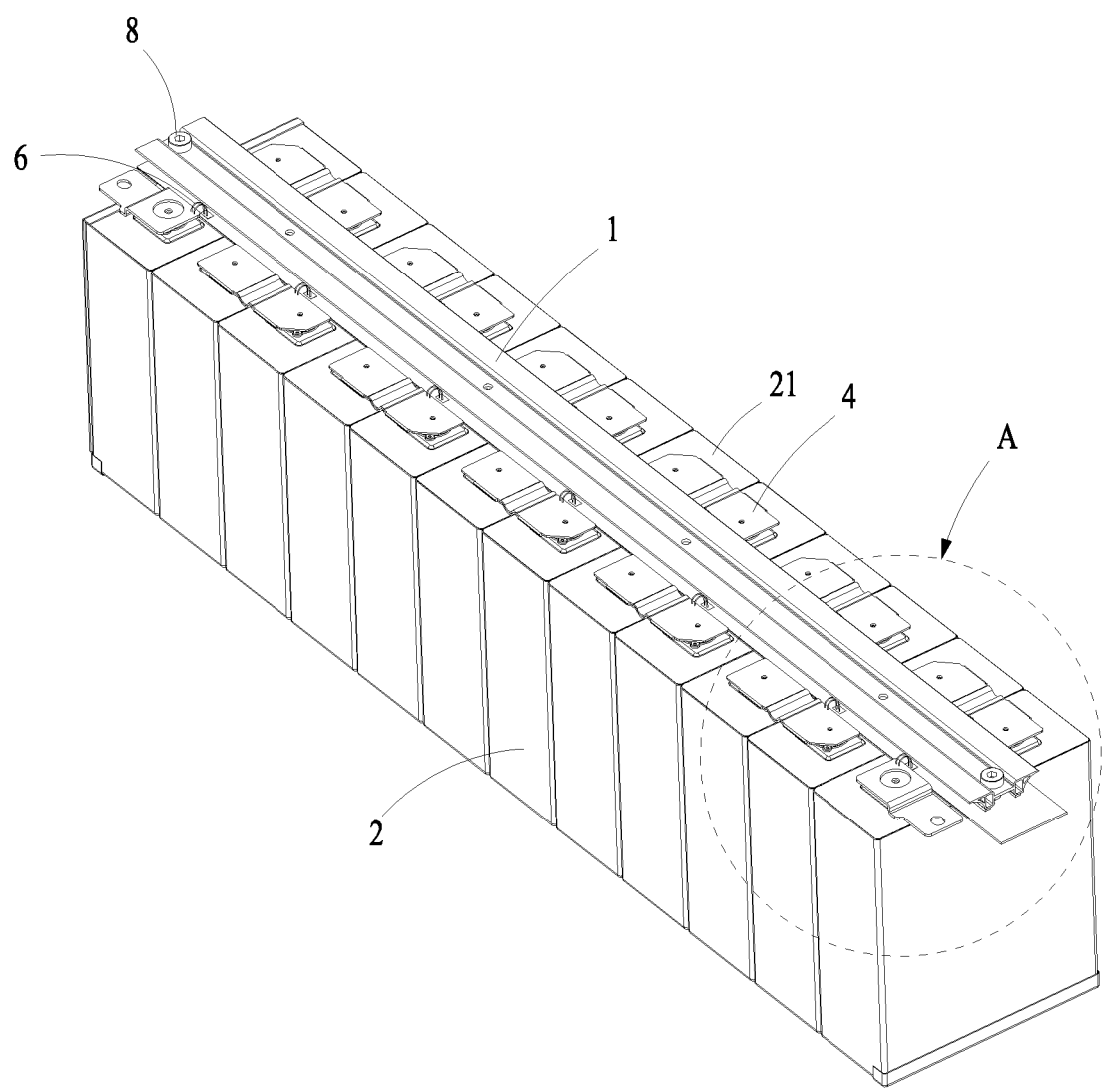
FIG. 2 is a schematic view showing an overall structure of a battery module according to an embodiment of the present disclosure.
Figure 4:
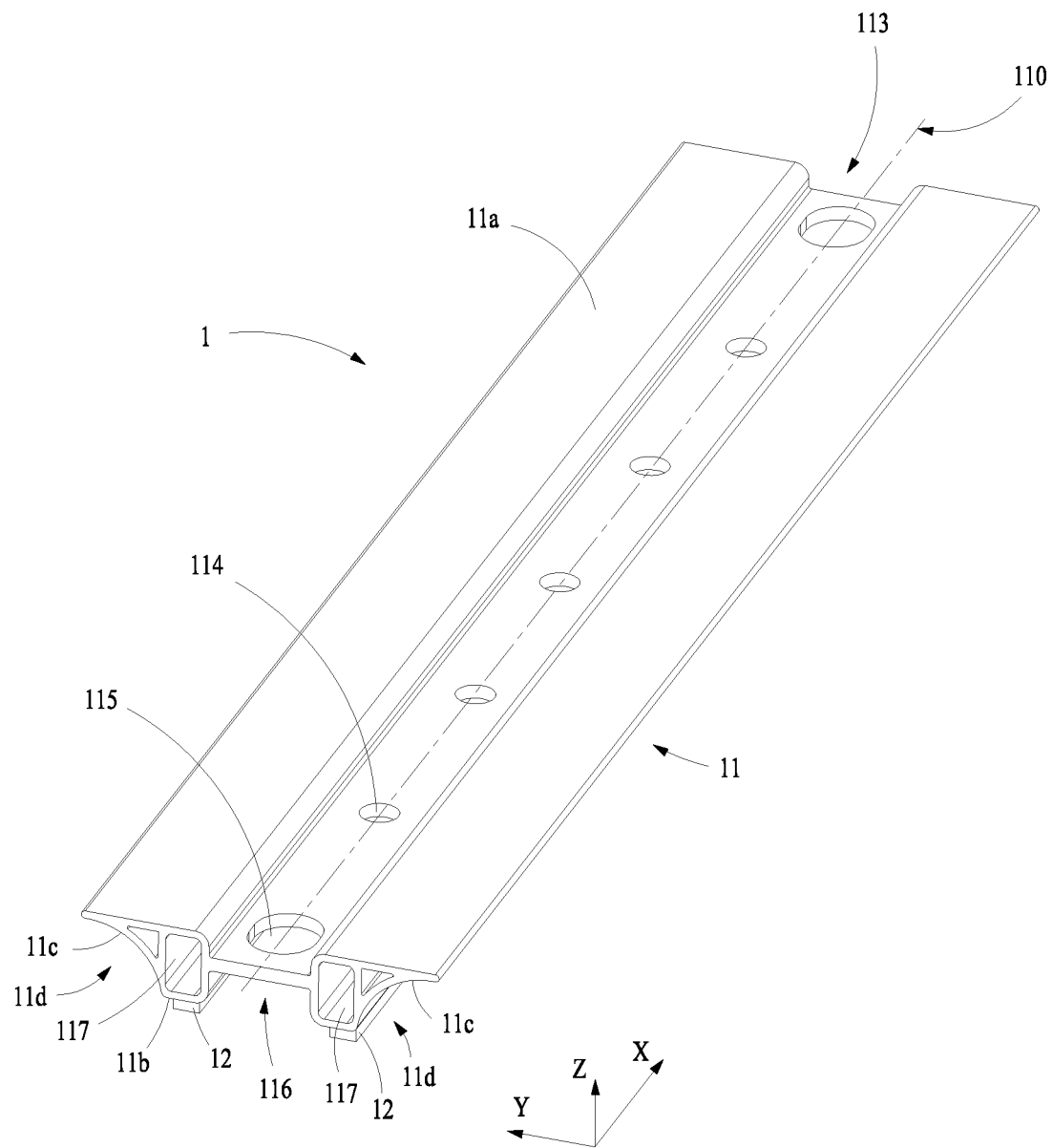
FIG. 4 is a schematic view showing an overall structure of a protective pressure plate according to an embodiment of the present disclosure.
Figure 5:
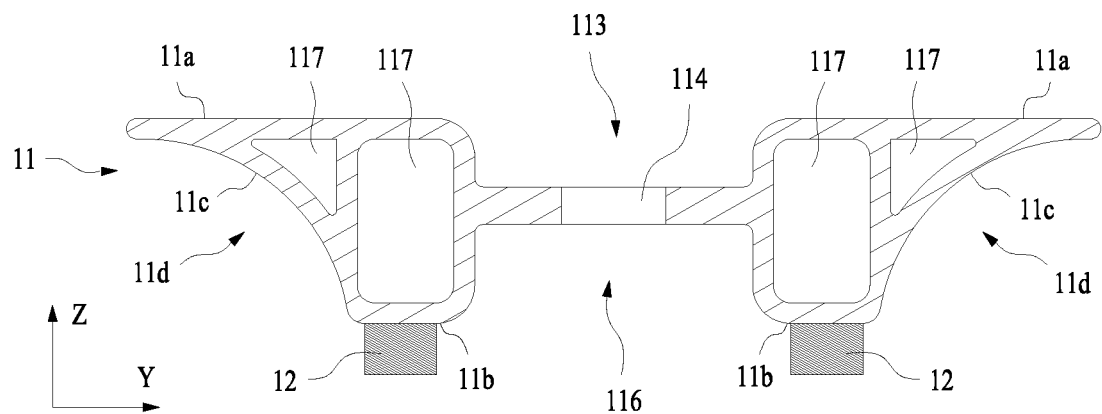
FIG. 5 is a schematic view showing a cross-sectional structure of a protective pressure plate according to an embodiment of the present disclosure.
Figure 6:
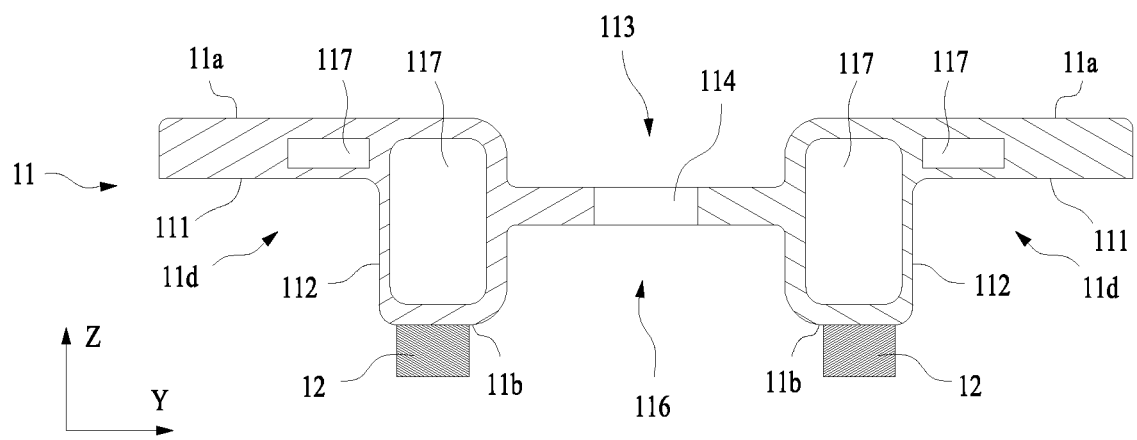
FIG. 6 is a schematic view showing a cross-sectional structure of a protective pressure plate according to another embodiment of the present disclosure.
Figure 7:
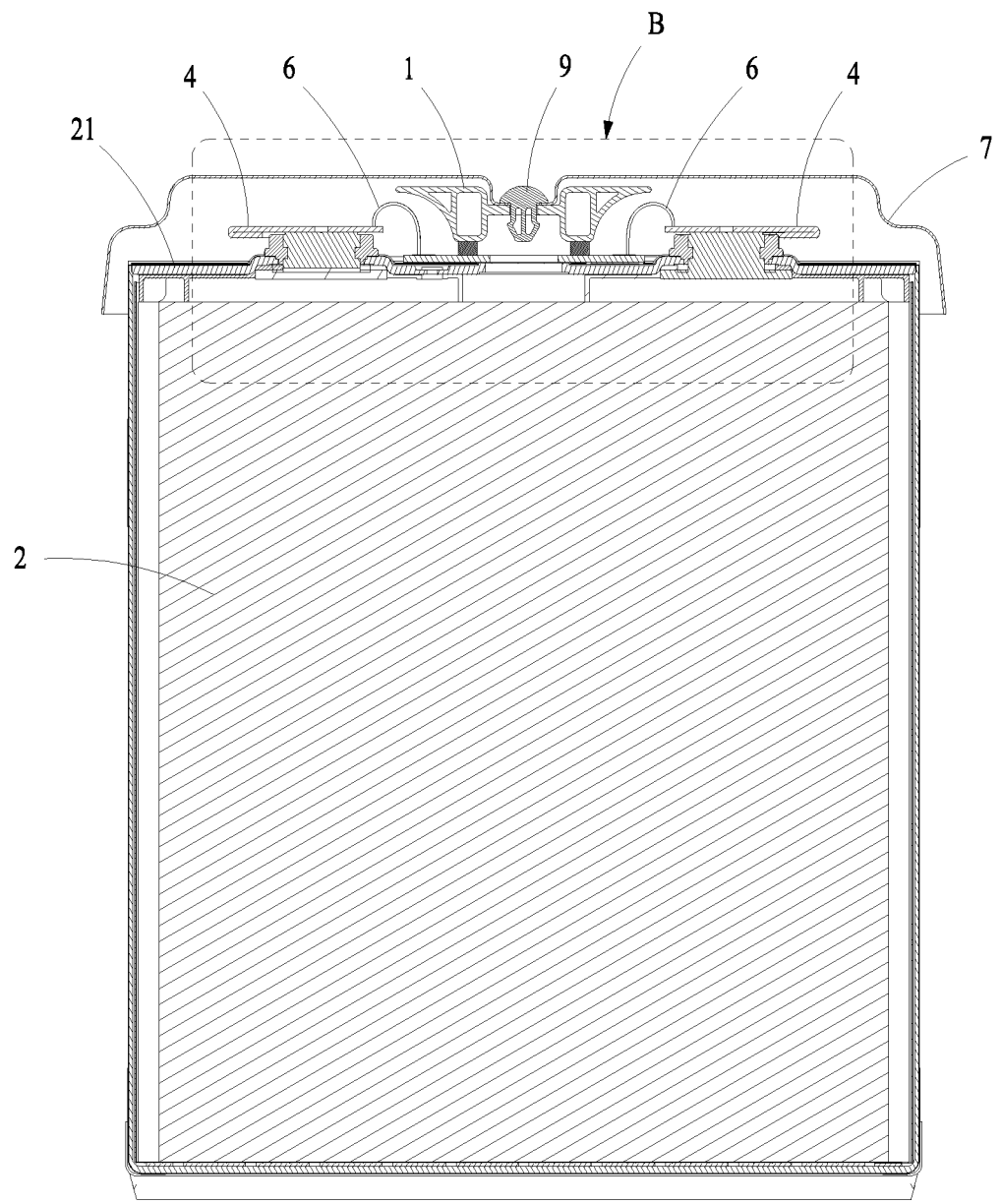
FIG. 7 is a cross-sectional structural view of a battery module according to an embodiment of the present disclosure.
Figure 9:
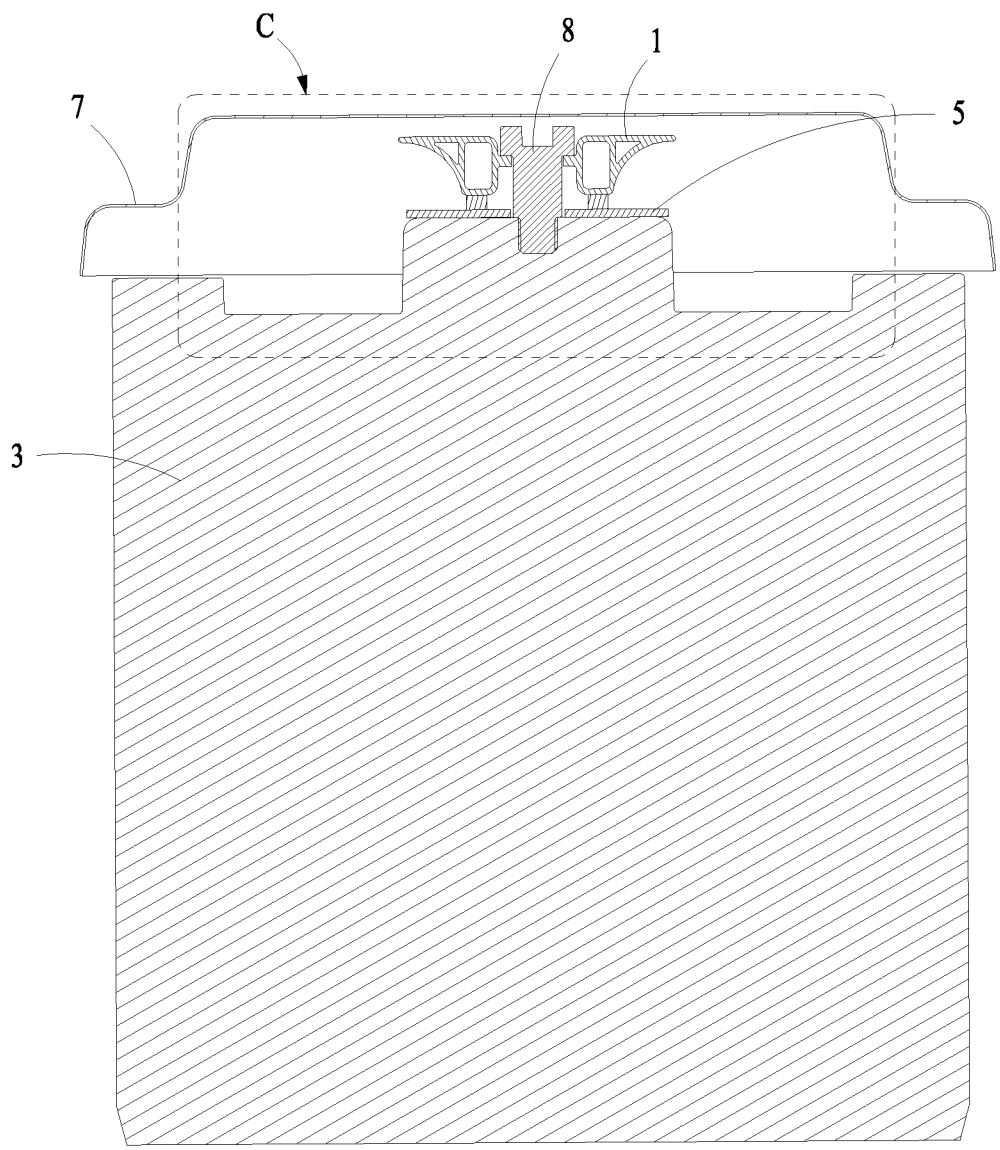
FIG. 9 is a cross-sectional structural view showing a state in which a protective pressure plate and end plates are combined according to an embodiment of the present disclosure.

FIG. 1 schematically shows an exploded structure of a battery module according to an embodiment. FIG. 2 schematically shows an overall structure of a battery module according to an embodiment. FIG. 4 schematically shows an overall structure of a protective pressure plate according to an embodiment of the present disclosure. FIG. 5 schematically shows a cross-sectional structure of a protective pressure plate according to an embodiment of the present disclosure. FIG. 6 schematically shows a cross-sectional structure of a protective pressure plate according to another embodiment of the present disclosure. FIG. 7 schematically shows a cross-sectional structure of a battery module according to an embodiment of the present disclosure. FIG. 9 schematically shows a cross-sectional structure of a state in which a protective pressure plate and end plates are combined according to an embodiment of the present disclosure.

Figure 3:
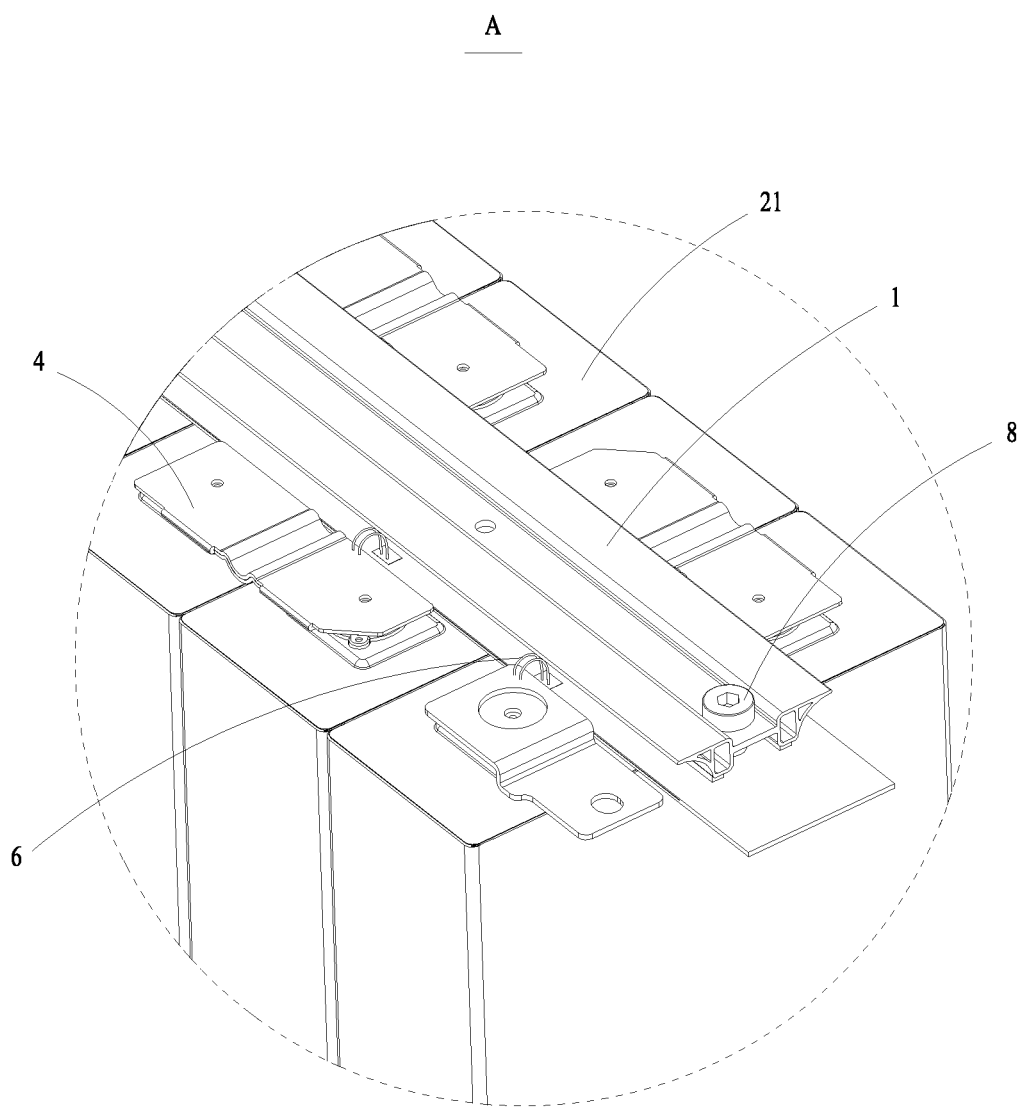
FIG. 3 is a partial enlarged view of a portion A in FIG. 2.

As shown in FIG. 1 to FIG. 3, the protective pressure plate 1 according to the embodiment of the present disclosure is applied into a battery module. The battery module according to this embodiment includes a plurality of batteries 2 which are arranged in one direction, two end plates 3, and two side plates (not shown). The plurality of batteries 2 form an assembly. The two end plates 3 are respectively disposed on opposite sides of the assembly in the direction in which the batteries 2 are arranged. All the batteries 2 are sandwiched between the two end plates 3. The two side plates are spaced apart in a direction perpendicular to the direction in which the batteries 2 are arranged, and are respectively connected to the two end plates 3. The two end plates 3 and the two side plates collectively form a fixing frame for fixing the plurality of batteries 2.

In the battery module according to this embodiment, the two adjacent batteries 2 are connected in series or in parallel via a busbar 4. The battery module further includes a circuit board 5 which is electrically connected to the busbar 4. The circuit board 5 is a flexible circuit board 5 (FPC) or a hard circuit board 5. The circuit board 5 has a strip-like shape extending in the direction in which the batteries 2 are arranged. The circuit board 5 is disposed to pass through a gap between the two electrodes of the battery 2 and contact with a top cover of the battery 2. The circuit board 5 is electrically connected to the busbar 4 via wires. Alternatively, the wire may be a bonding wire 6 or a metal wire having an insulating sheath. Wherein, the bonding wire 6 may be bonding aluminum wire. The bonding aluminum wire is aluminum filament. In the following, the technical solution of the present disclosure is described by taking the wire as the bonding wire 6 as an example, but the scope of protection of the present disclosure is not limited thereto.

According to this embodiment, one end of the bonding wire 6 is soldered to the circuit board 5 by welding, while the other end thereof is soldered to the busbar 4 by welding. The bonding wire 6 is typically directly exposed to the external environment. The bonding wire 6 has a small diameter and is easily deformed or broken under force.

The protective pressure plate 1 according to the embodiment of the present disclosure is pressed against the top cover 21 of the battery 2. The protective pressure plate 1 is disposed above the circuit board 5. On one hand, the protective pressure plate 1 can firmly press the circuit board 5 against the top cover 21 of the battery 2, thereby preventing the positional movement of the circuit board 5 from breaking the bonding wires 6, and also preventing an external object from directly colliding with the circuit board 5 to damage to the circuit board 5. On the other hand, the protective pressure plate 1 can protect the bonding wires 6, thereby preventing the bonding wires 6 from being disconnected from the busbar 4 or the circuit board 5 due to collision or extrusion of the external object.

As shown in FIG. 4, the protective pressure plate 1 according to this embodiment includes a pressure plate body 11 having a strip-like shape. The pressure plate body 11 has a predetermined length, a predetermined width, and a predetermined thickness. The pressure plate body 11 includes an upper surface 11a and a lower surface 11b which are opposed in the thickness direction Z thereof, and two side surfaces 11c which are opposed in the width direction Y thereof. The two side surfaces 11c are connected to the upper surface 11a and the lower surface 11b, respectively. The upper surface 11a, the lower surface 11b, and the two side surfaces 11c collectively form an outer peripheral surface of the pressure plate body 11. The lower surface 11b of the pressure plate body 11 presses the circuit board 5 against the top cover 21 of the battery 2. The upper surface 11a of the pressure plate body 11 faces away from the top cover 21 of the battery 2. The upper surface 11a and the lower surface 11b according to this embodiment may be both flat surfaces and may be parallel with each other. Alternatively, the upper surface 11a according to this embodiment may be a curved surface, and the lower surface 11b may be a flat surface.

At least one portion of each side surface 11c according to this embodiment is recessed toward the center line 110 of the pressure plate body 11 to form a protective recess 11d. The upper surface 11a of the pressure plate body 11 has a maximum width larger than the maximum width of the lower surface 11b, such that the cross section of the pressure plate body 11 has a contraction structure from wide to narrow in the thickness direction Z thereof. The center line 110 of the pressure plate body 11 extends in the length direction X of the pressure plate body 11. Alternatively, the side surface 11c is entirely recessed toward the center line 110 of the pressure plate body 11, and thus the entire side surface 11c forms a protective recess 11d, such that the region where the protective recess 11d is formed is directly connected to the upper surface 11a and the lower surface 11b. Alternatively, a portion of the side surface 11c is recessed toward the center line 110 of the pressure plate body 11 and thus only this portion forms the protective recess 11d, such that the region where the protective recess 11d on the side surface 11c is formed is directly connected to the lower surface 11b but is connected to the upper surface 11a via the region where no recess is formed on the side surface 11c.

After the protective pressure plate 1 according to this embodiment is connected fixedly to the battery 2, the circuit board 5 is pressed against the battery 2, and meanwhile, at least one portion of the bonding wire 6 is received in the protective recess 11d of the pressure plate body 11 to be protected by the pressure plate body 11. The pressure plate body 11 can prevent the external object from directly contacting the bonding wires 6, thereby avoiding the bonding wire 6 from being crushed or broken under an external force. In one example, the upper surface 11a of the protective pressure plate 1 is higher than the top of the bonding wire 6 when the top cover 21 of the battery 2 is used as a baseline.

In one embodiment, the plurality of bonding wires 6 are spaced apart in the direction in which the batteries 2 are arranged. The pressure plate body 11 includes two end portions which are opposed in the length direction X. Alternatively, the protective recess 11d penetrates the two end portions in the length direction X of the pressure plate body 11, such that each protective recess 11d can protect the plurality of bonding wires 6 provided on the same side. Alternatively, a plurality of protective recesses 11d may be provided on each side surface 11c. The plurality of protective recesses 11d are spaced apart in the length direction X of the pressure plate body 11. The number and position of the protective recesses 11d are in one-to-one correspondence with the number and position of the bonding wires 6.

As shown in FIG. 5, according to this embodiment, the region where the protective recess 11d is formed on the side surface 11c of the pressure plate body 11 transitions smoothly from the upper surface 11a to the lower surface 11b. The region where the protective recess 11d is formed on the side surface 11c may have a smooth curved or straight cross section. In one example, the region where the protective recess 11d is formed on the side surface 11c has an arc-shaped cross section. The bended portion of the bonding wire 6 in the connected state has an arched shape, such that the shape of the region where the protective recess 11d is formed on the side surface 11c may match with the shape of the bonding wire 6, and therefore, the pressure plate body 11 can protect the bonding wire 6 better.

As shown in FIG. 6, according to this embodiment, the region where the protective recess 11d is formed on the side surface 11c of the pressure plate body 11 has a stepped shape. According to this embodiment, one portion of the side surface 11c of the pressure plate body 11 is recessed. The region where the protective recess 11d is formed on the side surface 11c includes a first stepped surface 111 and a second stepped surface 112 which intersect with each other. The first stepped surface 111 is connected to the upper surface 11a. The second stepped surface 112 is connected to the lower surface 11b. Preferably, the first stepped surface 111 and the second stepped surface 112 are perpendicular to each other.

According to this embodiment, the pressure plate body 11 may be made of an insulating material, such as plastic, resin, or the like. The pressure plate body 11 having insulation property can avoid electrical connection with the circuit board 5, the bonding wires 6 or the busbar 4, thereby improving the use safety. The pressure plate body 11 according to this embodiment may also be made of a flame-retardant material, so as to meet the flame-retardant requirements. The pressure plate body 11 according to this embodiment may also be made of a mixed material of the insulating material and the flame-retardant material. For example, the mixed material for producing the pressure plate body 11 is formed by adding the flame-retardant material into the plastic raw material.

As shown in FIG. 4 to FIG. 6, the pressure plate body 11 according to this embodiment further includes a limiting groove 113 which is recessed from the upper surface 11a toward the lower surface 11b. The limiting groove 113 extends in the length direction X of the pressure plate body 11. The limiting groove 113 is used to guide the outer structural member and the pressure plate body 11, so as to achieve their accurate positioning. In one example, the battery module includes an insulating shield 7 which is disposed above the batteries 2. The insulating shield 7 may cover the top of the batteries 2, the circuit board 5, and the protective pressure plate 1 to protect each component. The insulating shield 7 includes a receiving portion which is recessed to face away from the batteries 2, and positioning projections which protrude toward the batteries 2 and are located inside the receiving portion. The insulating shield 7 is inserted into the limiting groove 113 of the pressure plate body 11 via the positioning protrusions, so as to achieve quick and accurate positioning and improve assembly efficiency. Alternatively, the limiting groove 113 has a U-shaped cross section.

In one embodiment, the pressure plate body 11 is provided with connecting holes 114 extending in the thickness direction Z of the pressure plate body 11. The opening of the connecting hole 114 is provided at the bottom of the limiting groove 113. The positioning protrusions of the insulating shield 7 are provided with mounting holes. When the insulating shield 7 and the pressure plate body 11 are positioned with each other, the mounting holes in the positioning projections are aligned with the connecting holes 114 in the pressure plate body 11. Then, the fastenings 9 are inserted into the mounting holes and the connecting holes 114 to connect and fix the insulating shield 7 and the pressure plate body 11.

In one embodiment, the pressure plate body 11 is further provided with fixing holes 115 for fixing the pressure plate body 11. The pressure plate body 11 is connected fixedly to the end plate 3 via the connecting members inserted into the fixing holes 115. Alternatively, the connecting member is a screw or a bolt. The opening of the fixing hole 115 is also disposed at the bottom of the limiting groove 113. Alternatively, the fixing hole 115 is a waist-type hole, which reserves a sufficient adjustment amount such that the pressure plate body 11 can flexibly adjust its position in the extending direction of the waist-type hole, thereby improving assembly convenience. In one example, each fixing hole 115 is provided at each of the two end portions of the pressure plate body 11. The plurality of connecting holes 114 are disposed between the two fixing holes 115. The fixing hole 115 and the connecting hole 114 are spaced apart.

The pressure plate body 11 according to this embodiment further includes a flow guiding groove 116 which is recessed from the lower surface 11b toward the upper surface 11a. The flow guiding groove 116 extends in the length direction X of the pressure plate body 11. When the pressure plate body 11 is connected fixedly to the batteries 2, the flow guiding groove 116 is disposed in correspondence with an anti-explosion valve which is provided on the top cover 21 of the battery 2, thereby allowing the anti-explosion valve to be opened, in order to avoid affecting normal operation of the anti-explosion valve. When the anti-explosion valve is opened, the gas discharged from the batteries 2 may flow along the extending direction of the flow guiding groove 116 under the guidance of the flow guiding groove 116, so as to prevent the expansion of the batteries 2 caused by the gas being unable to be discharged from the anti-explosion valve. Therefore, the safety of the battery module is improved. Alternatively, the flow guiding groove 116 has a U-shaped cross section. In one example, the limiting groove 113 and the flow guiding groove 116 are correspondingly disposed in the thickness direction Z of the pressure plate body 11. The fixing holes 115 and the connecting holes 114 provided in the pressure plate body 11 penetrate from the bottom of the limiting groove 113 to the bottom of the flow guiding groove 116.

The pressure plate body 11 according to this embodiment further includes a plurality of through holes 117 extending in the length direction X of the pressure plate body 11. Each of the through holes 117 penetrates the two end portions of the pressure plate body 11. On one hand, the through hole 117 can reduce the weight of the pressure plate body 11. On the other hand, the through hole 117, which may serve as a heat dissipation channel, can dissipate heat from the batteries 2 and the circuit board 5, and can reduce the temperature of the batteries 2 disposed in the central region and the circuit board 5. Alternatively, the through hole 117 has a circular, rectangular or triangular cross section.

The protective pressure plate 1 according to this embodiment further includes a flexible buffering member 12. The flexible buffering member 12 is disposed on the lower surface 11b and connected to the pressure plate body 11. The flexible buffering member 12 extends in the length direction X of the pressure plate body 11. The flexible buffering member 12 has a yielding space that extends in the thickness direction Z of the pressure plate body 11 and penetrates the flexible buffering member 12. The region on the pressure plate body 11 that corresponds to the yielding space is exposed to the external environment. In one example, the yielding space is disposed to correspond to the flow guiding groove 116. The pressure plate body 11 is pressed against the circuit board 5 via the flexible buffering member 12 to press the circuit board 5 against the top cover 21 of the battery 2, thereby preventing the pressure plate body 11 from cutting or scratching the circuit board 5 during installation or use. Meantime, the pressure plate body 11 and the circuit board 5 collectively press the flexible buffering member to deform the flexible buffering member, thereby preventing the occurrence of the gap between the pressure plate body 11 and the circuit board 5. Alternatively, the flexible buffering member 12 may be made of foam or rubber.

In one embodiment, the flexible buffering member 12 according to this embodiment includes two flexible buffering strips. The two flexible buffering strips are spaced apart in the width direction Y of the pressure plate body 11. The yielding space is the gap formed between the two flexible buffering strips. Alternatively, each of the flexible buffering strips is bonded to the lower surface 11b of the pressure plate body 11 by adhesion.

In one embodiment, the flexible buffering member 12 according to this embodiment is a buffering pad having a through hole. The through hole extends in the thickness direction Z of the pressure plate body 11. The yielding space is the through hole. Alternatively, the flexible buffering pad is bonded to the lower surface 11b of the pressure plate body 11 by adhesion.

The protective pressure plate 1 according to the embodiment of the present disclosure can be used not only to fix the circuit board 5, so as to maintain the position of the circuit board 5, but also to protect the bonding wires 6 connecting the circuit board 5 and the busbar 4 by using its protective recess 11d, so as to prevent the bonding wire 6 from being deformed, broken or electrically disconnected from the circuit board 5 or the busbar 4 under the external force. Therefore, use safety and stability of the battery module is improved.

Figure 8:
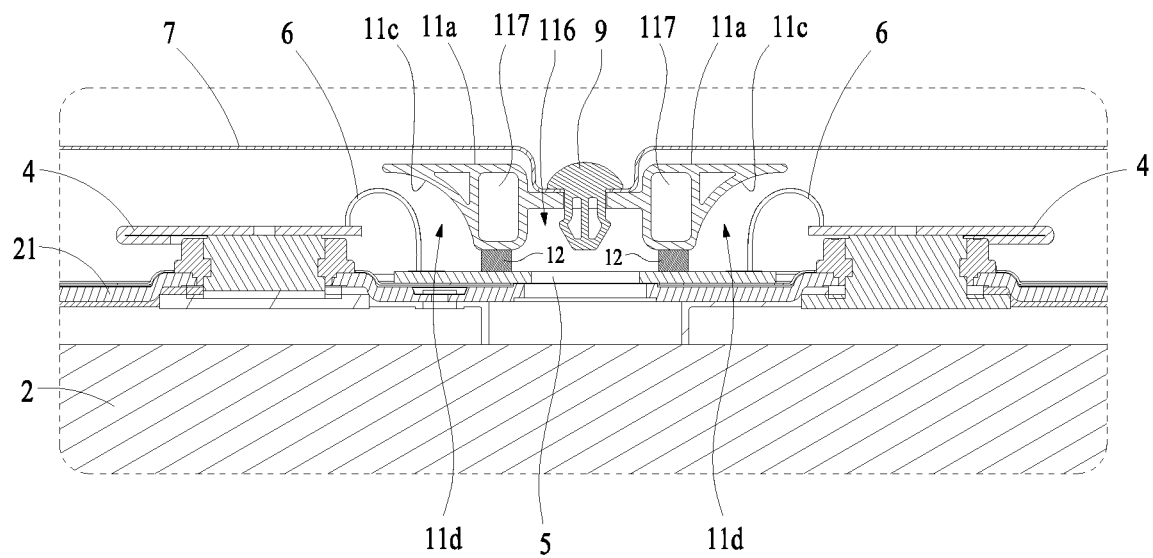
FIG. 8 is a partial enlarged view of a portion B in FIG. 7.

As shown in FIG. 1, FIG. 7 and FIG. 8, an embodiment of the present disclosure further provides a battery module including a plurality of batteries 2 which are arranged side by side in one direction, two end plates 3, two side plates, a circuit board 5 which is disposed to cover the outer surface of the top cover 21 of the battery 2, wires for connecting the batteries 2 and the circuit board 5, and the protective pressure plate 1 according to the above embodiment. The two adjacent batteries 2 are electrically connected via the busbar 4. The two adjacent batteries 2 may be connected in series or in parallel.

The circuit board 5 according to this embodiment is disposed to pass through the gap between the two electrodes of the battery 2. A yielding hole for the anti-explosion valve is provided in the circuit board 5. The yielding hole provided in the circuit board 5 is disposed to correspond to the anti-explosion valve provided on the top cover 21 of the battery 2. Therefore, the positional interference with the anti-explosion valve is prevented and the normal operation of the anti-explosion valve is ensured.

One end of the wire according to this embodiment is electrically connected to the circuit board 5, and the other end thereof is electrically connected to the busbar 4. Alternatively, the wire is a bonding aluminum wire. One end of the bonding aluminum wire is welded to the circuit board 5, and the other end thereof is welded to the busbar 4. The bonding aluminum wire has an arched shape and transitions smoothly. Therefore, the occurrence of breakage due to stress concentration is avoided.

The protective pressure plate 1 according to this embodiment is disposed above the circuit board 5. The protective pressure plate 1 is connected to the end plate 3 included in the battery module, to press the circuit board 5 against the outer surface of the top cover 21 of the battery 2. At least one portion of the wire is received in the protective recess 11d to be protected by the protective recess 11d. A predetermined distance is kept between the wire and the region where the protective recess 11d is formed on the side surface 11c. Therefore, the deformation of the wire caused by the contact between the pressure plate body 11 and the wire is prevented, while air insulation from each other is achieved.

The upper surface 11a of the pressure plate body 11 according to this embodiment has a width greater than or equal to the width of the circuit board 5. The pressure plate body 11 shields the circuit board 5 from directly above the circuit board 5, to effectively protect the circuit board 5. The lower surface 11b has a width less than or equal to the width of the circuit board 5. The lower surface 11b of the pressure plate body 11 does not pass across the edge of the circuit board 5, and therefore, the positional interference between the pressure plate body 11 and the adjacent components is prevented, and the mounting and fixing of the pressure plate body 11 is facilitated. In one embodiment, the upper surface 11a of the protective pressure plate 1 extends across the connection between the wires and the busbar 4 in the thickness direction Y, to completely cover the wires from above the wires. Therefore, extrusion and deformation of the wires caused by contact with the external object is prevented, and thus the wires are protected effectively.

Figure 10:
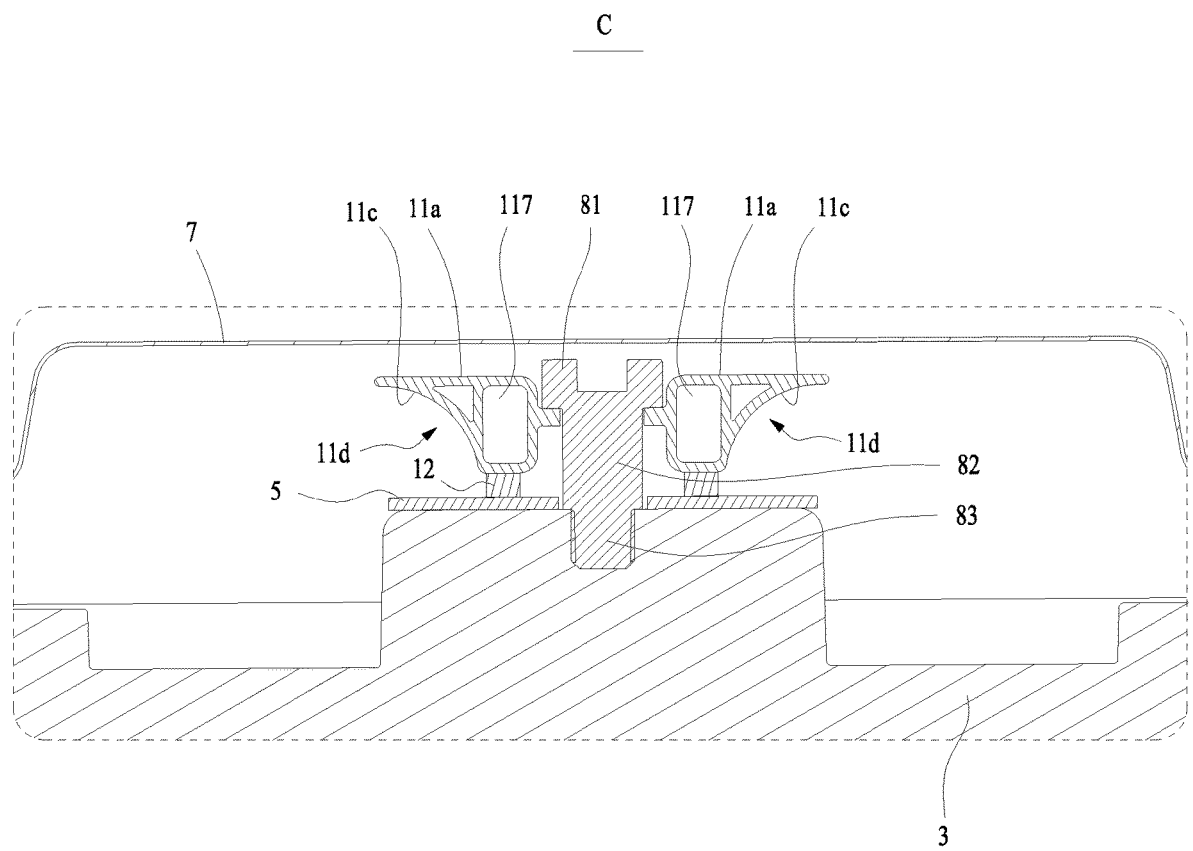
FIG. 10 is a partial enlarged view of a portion C in FIG. 9.

As shown in FIG. 1, FIG. 9, and FIG. 10, the battery module according to this embodiment includes two end plates 3. All the batteries 2 are sandwiched between the two end plates 3. The protective pressure plate 1 according to this embodiment is connected fixedly to the end plate 3 by fasteners 8. Fixing holes 115 are provided at the end portion of the protective pressure plate 1. The fasteners 8 are fixedly connected to the end plate 3 through the fixing hole 115.

In one embodiment, the fastener 8 is a screw that can be screwed to the end plate 3. The screw according to this embodiment has a nut 81 and a screw rod. The screw rod has a stepped shape. The screw rod includes a first shaft segment 82 and a second shaft segment 83 that have different diameters. The first shaft segment 82 is connected to the nut 81 and has a larger diameter than the second shaft segment 83. A stepped surface is formed between the first shaft segment 82 and the second shaft segment 83. When the second shaft section 83 of the fastener 8 is completely screwed into the end plate 3, the stepped surface contacts the outer surface of the end plate 3, and thereby preventing further screwing of the fastener 8. Thus, the pressure applied to the circuit board 5 by the pressure plate body 11 can be accurately controlled using the screwing depth of the fastener 8. Therefore, damage of the circuit board 5 due to excessive pressure or looseness of the circuit board 5 due to too little pressure is prevented. In the embodiment in which the flexible buffering member 12 is disposed below the pressure plate body 11, the compression amount of the flexible buffering member 12 can be accurately controlled using the screwing depth of the fastener 8. Therefore, lose of buffering property of the flexible buffering member 12 due to excessive compression amount is prevented. The screw rod is disposed to have a stepped shape, and the screwing depth of the fastener 8 is controlled using the length of the second shaft section 83, such that the mounting efficiency can be improved.

The battery module according to this embodiment further includes an insulating shield 7 for covering the batteries 2 and the protective pressure plate 1. The insulating shield 7 is disposed above the batteries 2. The insulating shield 7 is snap-fitted with the protective pressure plate 1 via a snap-fit member 9, and therefore, installation speed is fast and installation efficiency is high. The insulating shield 7 can effectively insulate the top of the battery 2 and the components disposed on the top. The insulating shield 7 includes a receiving portion which is recessed to face away from the batteries 2, and positioning projection which protrudes toward the batteries 2 and are located inside the receiving portion. Alternatively, the insulating shield 7 may be made of plastic or rubber. The protective pressure plate 1 can support the insulating shield 7, so as to prevent the insulating shield 7 from collapsing and coming into contact with the wires.

The battery module according to the embodiment of the present disclosure has the protective pressure plate 1 that fixes the circuit board 5 and protects the wires connecting the circuit board 5 and the busbar 4. The protective pressure plate 1 can firmly press the circuit board 5 against the top cover 21 of the battery 2, thereby preventing the circuit board 5 from being shaken to break the wires or from being disconnected from the wires. The protective pressure plate 1 can also protect the wires, thereby avoiding deformation or breakage of the wires caused by external objects directly applying a pressing force to the wires. Therefore, disconnection of the wires from the circuit board 5 or the busbar 4 is prevented, and the use safety and stability of the battery module is improved.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

REFERENCE NUMERALS 1 protective pressure plate
11 pressure plate body 11a upper surface
11b lower surface
11c side surface
11d protective recess
110 center line
111 first stepped surface
112 second stepped surface
113 limiting groove
114 connecting hole
115 fixing hole
116 flow guiding groove
117 through hole
12 flexible buffering member
2 battery
21 top cover
3 end plate
4 busbar
5 circuit board
6 wires
7 insulation shield
8 fastener
81 nut
82 first shaft segment
83 second shaft segment
9 snap-fit member
X length direction
Y width direction
Z thickness direction

What is claimed is:

1. A protective pressure plate for a battery module, comprising:
a pressure plate body having a strip-like shape, wherein the pressure plate body includes an upper surface and a lower surface that are opposed in a thickness direction of the pressure plate body and two side surfaces that are opposed in a width direction of the pressure plate body, at least one portion of each of the side surfaces is recessed toward a center line of the pressure plate body to form a protective recess, the upper surface of the pressure plate body has a maximum width greater than a maximum width of the lower surface.

2. The protective pressure plate according to claim 1, wherein a region where the protective recess is formed on the side surface transitions smoothly from the upper surface to the lower surface.

3. The protective pressure plate according to claim 1, wherein a region where the protective recess is formed on the side surface has a circular or a stepped cross section.

4. The protective pressure plate according to claim 1, wherein the pressure plate body further includes a limiting groove which is recessed from the upper surface toward the lower surface, and the limiting groove extends in a length direction of the pressure plate body.

5. The protective pressure plate according to claim 1, wherein the pressure plate body further includes a flow guiding groove which is recessed from the lower surface toward the upper surface, and the flow guiding groove extends in a length direction of the pressure plate body.

6. The protective pressure plate according to claim 1, wherein the pressure plate body further includes fixing holes and connecting holes extending in the thickness direction, and the fixing holes and the connecting holes are spaced apart in a length direction of the pressure plate body.

7. The protective pressure plate according to claim 1, wherein the protective pressure plate further comprises a flexible buffering member, the flexible buffering member is connected to the pressure plate body and disposed on the lower surface, the flexible buffering member extends in a length direction of the pressure plate body, the flexible buffering member has a yielding space extending in the thickness direction of the pressure plate body and penetrating the flexible buffering member, the region on the pressure plate body corresponding to the yielding space is exposed to external environment.

8. The protective pressure plate according to claim 7, wherein the flexible buffering member includes two buffering strips which are spaced apart in the width direction of the pressure plate body, and the yielding space is a gap formed between the two buffering strips; or
the flexible buffering member is a buffering pad, the buffering pad has a through hole extending in the thickness direction of the pressure plate body, and the yielding space is the through hole.

9. A battery module, comprising:
a plurality of batteries, which are arranged side by side in one direction, wherein two adjacent batteries in the plurality of batteries are electrically connected by a busbar, each battery includes a top cover;
a circuit board, which is disposed on an outer surface of the top cover of the battery and extends in a direction in which the plurality of batteries are arranged;
wires, via which the circuit board is electrically connected to the busbar; and
the protective pressure plate according to claim 1, wherein the protective pressure plate is disposed above the circuit board to press the circuit board against the outer surface of the top cover, at least one portion of the wires is received in the protective recess to be protected by the protective recess.

10. The battery module according to claim 9, wherein the upper surface of the pressure plate body has a width greater than or equal to a width of the circuit board, and the lower surface has a width less than or equal to a width of the circuit board.

11. The battery module according to claim 9, wherein the battery module further comprises two end plates between which the plurality of batteries are disposed, and the protective pressure plate is connected fixedly to at least one of the end plates by fasteners.

12. The battery module according to claim 9, further comprising an insulating shield for covering all the batteries and the protective pressure plate, wherein the insulating shield is disposed above the batteries, and the insulating shield is snap-fitted to the protective pressure plate by a snap-fit member.

* * * * *